US011586778B2

(12) United States Patent
Giterman et al.

(10) Patent No.: US 11,586,778 B2
(45) Date of Patent: Feb. 21, 2023

(54) SECURED MEMORY

(71) Applicant: Bar-Ilan University, Ramat-Gan (IL)

(72) Inventors: Robert Giterman, Beer-Sheva (IL); Itamar Levi, Lehavim (IL); Yoav Weizman, Kfar-Vitkin (IL); Osnat Keren, Rosh HaAyin (IL); Alexander Fish, Tel-Mond (IL); Maoz Vizentovski, Netanya (IL)

(73) Assignee: Bar-Ilan University, Ramat-Gan (IL)

( * ) Notice: Subject to any disclaimer, the term of this patent is extended or adjusted under 35 U.S.C. 154(b) by 270 days.

(21) Appl. No.: 16/769,664

(22) PCT Filed: Dec. 6, 2018

(86) PCT No.: PCT/IL2018/051338
§ 371 (c)(1),
(2) Date: Jun. 4, 2020

(87) PCT Pub. No.: WO2019/111260
PCT Pub. Date: Jun. 13, 2019

(65) Prior Publication Data
US 2020/0372186 A1 Nov. 26, 2020

Related U.S. Application Data

(60) Provisional application No. 62/595,600, filed on Dec. 7, 2017.

(51) Int. Cl.
*G06F 21/75* (2013.01)
*G06F 13/16* (2006.01)
(Continued)

(52) U.S. Cl.
CPC ........ *G06F 21/755* (2017.08); *G06F 13/1668* (2013.01); *G06F 21/72* (2013.01); *G11C 7/24* (2013.01)

(58) Field of Classification Search
CPC .... G06F 21/755; G06F 13/1668; G06F 21/72; G06F 21/75; G11C 7/24; G11C 7/222; G11C 11/418; G11C 11/419
See application file for complete search history.

(56) References Cited

U.S. PATENT DOCUMENTS 6,469,546 B2 * 10/2002 Matano ............... G11C 11/4097
365/207
7,734,861 B2   6/2010 Li et al.
(Continued)

FOREIGN PATENT DOCUMENTS

WO   WO 2019/111260   6/2019

OTHER PUBLICATIONS

International Preliminary Report on Patentability dated Jun. 18, 2020 From the International Bureau of WIPO Re. Application No. PCT/IL2018/051338. (10 Pages).
(Continued)

*Primary Examiner* — Baotran N To

(57) ABSTRACT

A hardware memory includes at least one memory cell, peripheral circuitry and randomization circuitry. The memory cell(s) store data, which may be written to, read from and held in the hardware memory. The peripheral circuitry reads and writes data to the memory cell(s) and may perform other functions necessary for facilitating the data read, write and hold. The randomization circuitry randomizes operations performed by the peripheral circuitry to reduce a correlation between the data and the current consumed by the hardware memory.

25 Claims, 7 Drawing Sheets

(51) Int. Cl.
  *G06F 21/72* (2013.01)
  *G11C 7/24* (2006.01)

(56) References Cited

U.S. PATENT DOCUMENTS

| | | | | |
|---|---|---|---|---|
| 8,296,577 | B2 | 10/2012 | Shu et al. | |
| 9,666,255 | B2 | 5/2017 | Tran et al. | |
| 2002/0000838 | A1* | 1/2002 | Matano | G11C 7/065 327/52 |
| 2004/0150005 | A1* | 8/2004 | Mitoma | G11C 11/4099 257/200 |
| 2005/0271202 | A1* | 12/2005 | Shu | G06F 9/3001 712/E9.035 |
| 2005/0273631 | A1* | 12/2005 | Shu | H04L 9/0625 712/E9.035 |
| 2008/0123446 | A1* | 5/2008 | Pickles | G11C 7/24 365/194 |
| 2009/0109779 | A1* | 4/2009 | Kitayama | G11C 7/08 365/205 |
| 2011/0080795 | A1* | 4/2011 | Pyo | G11C 7/12 365/207 |
| 2012/0144205 | A1* | 6/2012 | Shu | G06F 21/85 713/189 |
| 2022/0020427 | A1* | 1/2022 | Lu | G06F 21/44 |

OTHER PUBLICATIONS

International Search Report and the Written Opinion dated Mar. 21, 2019 From the International Searching Authority Re. Application No. PCT/IL2018/051338. (20 Pages).

Juels "RFID Security and Privacy: A Research Survey", IEEE Journal on Selected Areas in Communications, 24(2): 381-394, Feb. 2006.

Kocher et al. "Differential Power Analysis", Proceedings of the 19th Annual International Cryptology Conference on Advances in Cryptology, CRYPTO '99, Aug. 15-19, 1999, p. 388-397, Aug. 15, 1999.

Konur et al. "Power Analysis Resistant SRAM", World Automation Congress, WAC 2006, Budapest, Hungary, Jul. 24-26, 2006, p. 1-6, Jul. 24, 2006.

Ravi et al. "Security in Embedded Systems: Design Challenges", ACM Transactions on Embedded Computing Systems, TECS, 3(3): 461-491, Aug. 2004.

Ravi et al. "Tamper Resistance Mechanisms for Secure Embedded Systems", Proceedings of the 17th International Conference on VLSI Design, VSLID '04, Mumbai, India, Jan. 5-9, 2004, p. 605-611, Jan. 5, 2004.

Rozic et al. "Design Solutions for Securing SRAM Cell Against Power Analysis", 2012 IEEE International Symposium on Hardware-Oriented Security and Trust, San Francisco, CA, USA, Jun. 3-4, 2012, p. 122-127, Jun. 3, 2012.

Verma et al. "A 256 KB 65 NM 8T Subthreshold SRAM Employing Sense-Amplifier Redundancy", IEEE Journal of Solid-State Circuits, 43(1): 141-149, Jan. 2008.

* cited by examiner

SECURED MEMORY

RELATED APPLICATIONS

This application is a National Phase of PCT Patent Application No. PCT/IL2018/051338 having International filing date of Dec. 6, 2018, which claims the benefit of priority under 35 USC § 119(e) of U.S. Provisional Patent Application No. 62/595,600 filed on Dec. 7, 2017. The contents of the above applications are all incorporated by reference as if fully set forth herein in their entirety.

FIELD AND BACKGROUND OF THE INVENTION

The present invention, in some embodiments thereof, relates to securing a hardware memory and, more particularly, but not exclusively, to securing an embedded memory against side channel attacks (SCA).

Hardware security has become a serious issue in Very-large-scale integration (VLSI) system on chip (SoC) design. While considerable research has been done on development of secure logic styles, less attention has been paid to designing secured embedded memories. Storing private or secret data in embedded memories is much more beneficial than storing it in flip flops, as the area of a single memory cell may be up to 10λ smaller than the area of flip flops available in the standard cell libraries.

In the recent years the use of cryptographic devices storing secret and sensitive information has expanded and become essential in many applications. Cryptographic devices are vulnerable to many threats, such as tag tracking, jamming, blocking, cloning, and eavesdropping.

Another significant and powerful threat to these devices is extracting the secret key by non-invasive Side-Channel Attacks (SCA). SCA on cryptographic devices exploits unintentionally information leaks from physical channels, such as power consumption, electromagnetic emission, timing properties, etc. In particular, Power Analysis (PA) is a type of SCA, which utilizes the processed information which leaks through the power dissipation of a device. PA is based on the correlation between the instantaneous power consumed by the device and the processed or stored data. It exploits this correlation to extract a secret key or sensitive information. PA attacks do not require any information about the actual hardware implementation of the cryptographic device, only the functionality of the modules has to be known.

Conventional embedded memories, typically implemented by 6 transistor (6T) SRAM bit cells, are highly susceptible to side-channel attacks used to reveal the data stored in the memory array. While embedded memories are usually optimized for density and performance, little attention has been given to defending them against side-channel attacks, such as differential power analysis and electromagnetic radiation.

In the context of Side-Channel-Information (SCA) attacks, data-dependent asymmetric current/power dissipation (which occurs in standard 6T and 8T SRAM bit cells), serves as a potential source to information leakage to be utilized by an attacker. Countermeasures to such attacks can be realized at different abstraction levels. For example, several circuit level solutions were recently suggested, alternating the bit cell configuration by the addition of several transistors [2, 6].

While there are cell-level approaches for combating power analysis attacks, solutions at the bit cell level are often impractical since they require specific peripheral circuitry, resulting in an extra area overhead and complexity. Furthermore, other design considerations, such as performance and stability may be degraded. There are currently no gate-level or architectural design approaches for protecting memory cells or memory arrays against power analysis attacks.

Additional background art includes:

[1] Ravi, Srivaths, et al. "Security in embedded systems: Design challenges."*ACM Transactions on Embedded Computing Systems (TECS)* 3.3 (2004): 461-491.

[2] Rožić, Vladimir, Wim Dehaene, and Ingrid Verbauwhede. "Design solutions for securing SRAM cell against power analysis." *Hardware-Oriented Security and Trust (HOST), 2012 IEEE International Symposium on.* IEEE, 2012.

[3] N. Verma and A. P. Chandrakasan, "A 256 kb 65 nm 8T Subthreshold SRAM Employing Sense-Amplifier Redundancy," *Solid-State Circuits, IEEE Journal of,* vol. 43, pp. 141-149, 2008.

[4] Kocher, Paul, Joshua Jaffe, and Benjamin Jun. "Differential power analysis."*Advances in Cryptology—CRYPTO'99.* Springer Berlin Heidelberg, 1999.

[5] Ravi, Srivaths, Anand Raghunathan, and Srimat Chakradhar. "Tamper resistance mechanisms for secure embedded systems." VLSI Design, 2004. Proceedings. 17th International Conference on. IEEE, 2004.

[6] Konur, Engin, et al. "Power analysis resistant SRAM." *Automation Congress,* 2006. Wac'06. World. IEEE, 2006.

[7] A. Juels, "RFID security and privacy: a research survey," *IEEE J. Sel. Areas Commun.,* vol. 24, no. 2, pp. 381-394, February 2006.

[8] P. Kocher, J. Jaffe, and B. Jun, "Differential Power Analysis," in *Advances in Cryptology—CRYPTO'99,* M. Wiener, Ed. Springer Berlin Heidelberg, 1999, pp. 388-397.

[9] S. Mangard, E. Oswald, and T. Popp, *Power Analysis Attacks: Revealing the Secrets of Smart Cards.* Springer Science & Business Media, 2008.

SUMMARY OF THE INVENTION

Embodiments presented herein reduce the correlation between the data and the consumed current by adding randomness into the operation of peripheral circuitry in an embedded memory or memory device. Randomness may be embedded in different levels, from the circuit level up to the architecture level. By reducing the correlation between the memory data and the consumed current, the attacker is forced to collect a large number of power measurements in order to average out this random noise.

According to an aspect of some embodiments of the present invention there is provided a hardware memory, which includes:

at least one memory cell configured to store data;

peripheral circuitry, associated with the memory cell or cells, configured to read and write data to the at least one memory cell; and randomization circuitry, associated with the peripheral circuitry, configured to reduce a correlation between current consumed by the hardware memory and the data by randomizing peripheral circuitry operation.

According to some embodiments of the invention, randomizing peripheral circuitry operation is performed per cycle.

According to some embodiments of the invention, randomizing peripheral circuitry operation is performed intra-cycle.

According to some embodiments of the invention, the peripheral circuitry includes at least one of:
pre-charge circuitry;
a decoder;
a power gate;
a sense amplifier;
read/write circuitry;
supply voltage booster circuitry;
a supply voltage generator
a hardware controller;
a multiplexer;
a logic element;
a timing element;
biasing circuitry;
a processor;
a driver;
a level shifter; and
a delay element.

According to some embodiments of the invention, the randomization circuitry reduces a correlation between the current consumed by the hardware memory and data held in the at least one memory cell.

According to some embodiments of the invention, the randomization circuitry reduces a correlation between the current consumed by the hardware memory and data written to the at least one memory cell.

According to some embodiments of the invention, the randomization circuitry reduces a correlation between the current consumed by the hardware memory and data read from the at least one memory cell.

According to some embodiments of the invention, the randomization circuitry provides control signals to inputs of the peripheral circuitry.

According to some embodiments of the invention, the randomization circuitry controls the peripheral circuitry to modulate at least one of an amplitude behavior and a temporal behavior of said current consumed by said hardware memory.

According to some embodiments of the invention, the hardware memory includes multiple memory cells arranged as an array, and during write operations the randomization circuitry controls the peripheral circuitry to write data to the array by:
cutting off power to a selected row of the array;
charging respective bit lines of memory cells in the row randomly to one of a first voltage
level and a second voltage level;
asserting a selected word line;
charging the bit lines to respective levels of the write data; and
asserting the selected word line.

According to some embodiments of the invention, the randomization circuitry controls the peripheral circuitry to write data to at least one of the memory cells by:
charging at least two storage nodes of the memory cell respectively to one of a first voltage level and a second voltage level, the first voltage level and the second voltage level being randomly selected for the respective storage node; and
writing the data to the at least one memory cell.

According to some embodiments of the invention, the randomization circuitry is configured to randomly vary supply voltage levels applied to at least one bit line of the at least one memory cell.

According to some embodiments of the invention, the randomization circuitry is configured to randomly vary supply voltage levels applied to respective word lines of the at least one memory cell.

According to some embodiments of the invention, the peripheral circuitry includes at least one sense-amplifier, and the randomization circuitry is configured to randomize current consumption of the sense amplifier.

According to some embodiments of the invention, randomizing current consumption of the at least one sense amplifier includes at least one of:
randomizing enable signal delays of the at least one sense amplifier;
randomizing enable signal voltage levels of the at least one sense amplifier;
randomizing respective leakage powers of the at least one sense amplifier;
randomly disconnecting an input of the at least one sense amplifier during a data hold state; and
randomly disconnecting an input of the at least one sense amplifier during a data write cycle.

According to some embodiments of the invention, the hardware memory further includes a hardware data interface for writing to the at least one memory cell and outputting data read from the at least one memory cell.

According to an aspect of some embodiments of the present invention there is provided a method for securing a memory which includes:
providing a hardware memory including at least one memory cell configured to store data and peripheral circuitry configured to control the at least one memory cell; and
reducing a correlation between current consumed by the hardware memory and the data by randomizing operations of the peripheral circuitry.

According to some embodiments of the invention, randomizing operations of the peripheral circuitry includes inputting randomized control signals to the peripheral circuitry.

According to some embodiments of the invention, randomizing operations of the peripheral circuitry includes altering signals output by the peripheral circuitry and inputting the altered signals to the at least one memory cell.

According to some embodiments of the invention, the correlation is between the current consumed by the hardware memory and at least one of:
a) data held in the hardware memory;
b) data written to the hardware memory; and
c) data read from the hardware memory.

According to some embodiments of the invention, randomizing operations of the peripheral circuitry includes introducing at least one of amplitude randomization and temporal randomization to the current consumed by the hardware memory.

According to some embodiments of the invention, randomizing operations of the peripheral circuitry includes:
randomly selecting a respective one of a first voltage level and a second voltage level for multiple storage nodes of the at least one memory cell;
charging the storage nodes to the respective selected supply voltages; and
writing the data to the hardware memory.

According to some embodiments of the invention, randomizing operations of the peripheral circuitry include randomly varying supply voltage levels applied to at least one bit line of the hardware memory.

According to some embodiments of the invention, randomizing operations of the peripheral circuitry includes randomly varying supply voltage levels applied to at least one word line of the hardware memory.

According to some embodiments of the invention, randomizing operations of the peripheral circuitry includes randomizing current consumption of at least one sense amplifier configured to amplify output signals read from the at least one memory cell.

According to some embodiments of the invention, randomizing operations of the peripheral circuitry includes at least one of:

randomizing enable signal delays of the at least one sense amplifier;

randomizing enable signal voltage levels of the at least one sense amplifier;

randomizing respective leakage powers of the at least one sense amplifier;

randomly disconnecting an input of the at least one sense amplifier during a data hold state; and randomly disconnecting an input of the at least one sense amplifier during a data write cycle.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
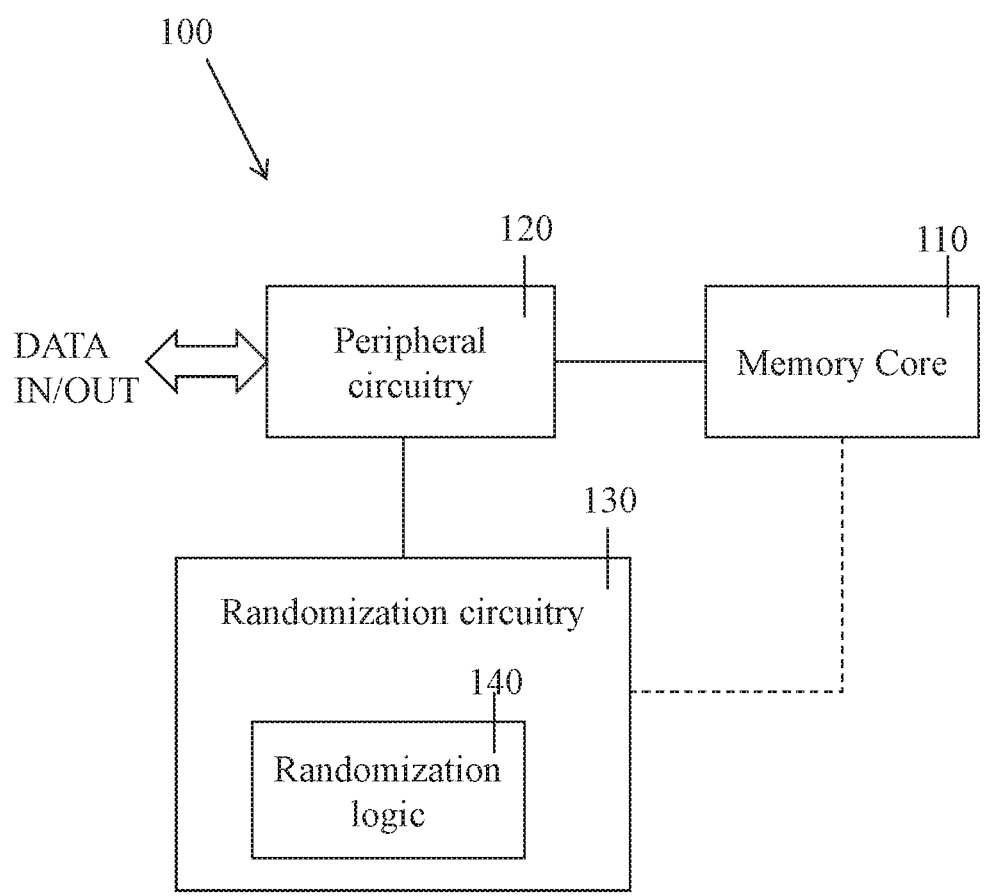
FIG. 1 is a simplified block diagram of a hardware memory, according to embodiments of the invention.

The present invention, in some embodiments thereof, relates to securing a hardware memory and, more particularly, but not exclusively, to securing an embedded memory against side channel attacks (SCA).

The embodiments presented herein reduce the correlation between memory data and the current consumed by the memory. This reduction in correlation is achieved by randomizing aspects of the operation of the peripheral circuitry of the memory. Due to this reduction in correlation, a power-analysis attacker has a significantly reduced chance of identifying data processed by the memory data even after collecting a large amount of current measurements.

The benefits of this increased memory security are obtained with no need to change the layout of the memory cells themselves. The techniques described herein may be implemented with minimal changes to the architecture of the memory itself. Embodiments presented herein may be implemented for memories, which contain a single memory cell and on memories, which contain multiple memory cells.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Memory

Referring now to the drawings, FIG. 1 is a simplified block diagram of a hardware memory, according to embodiments of the invention. Memory 100 includes memory core 110, peripheral circuitry 120 and randomization circuitry 130. Optionally, memory 100 is an embedded memory (e.g. in an integrated circuit such as a field-programmable gate array or application-specific integrated circuit). Alternately, memory 100 is a standalone device.

Memory Core

Figure 2:
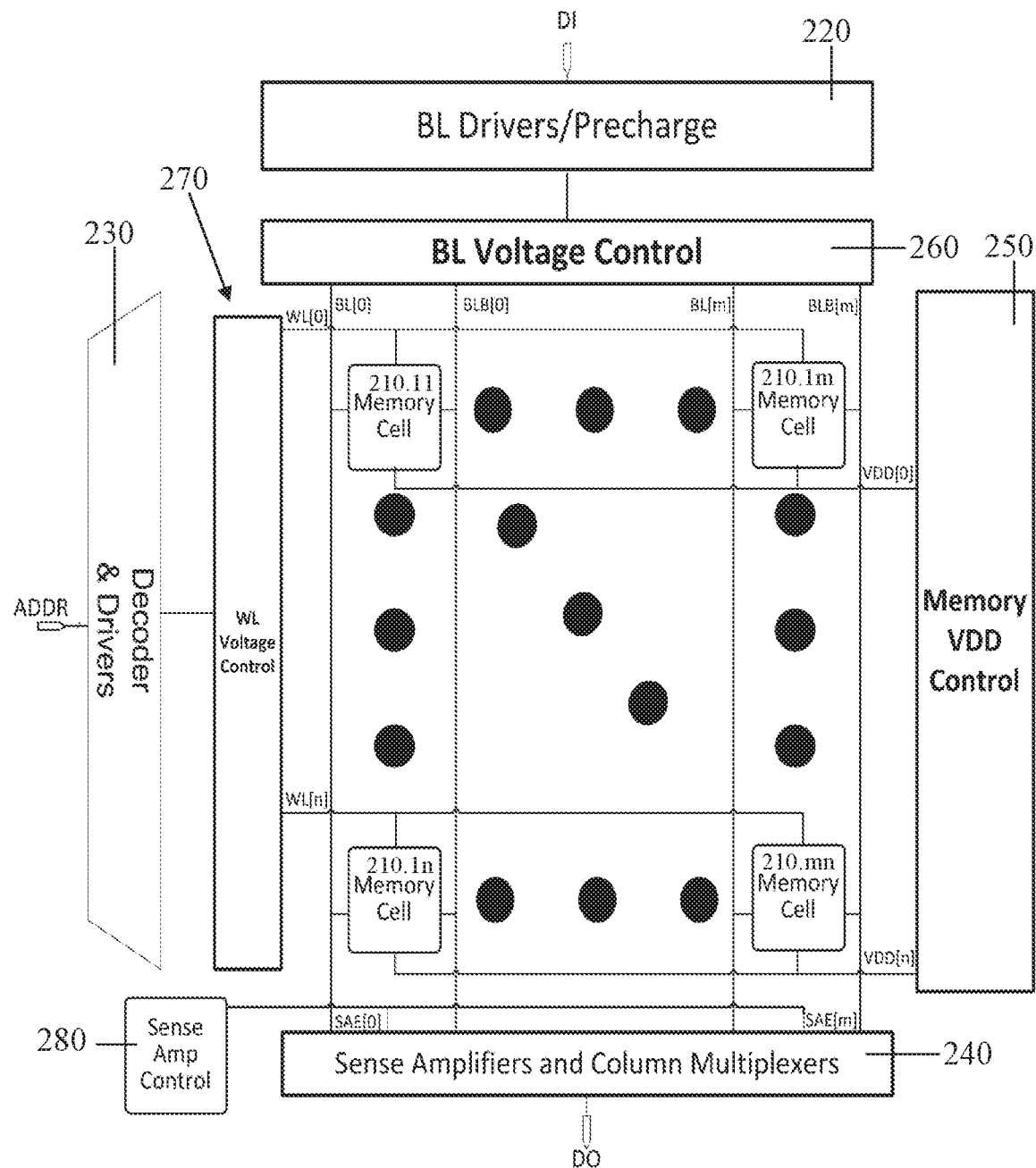
FIG. 2 is a simplified block diagram of a hardware memory, according to an exemplary embodiment of the invention.

Memory core 110 includes one or more memory cells. In memories containing multiple memory cells, the memory cells may be arranged and accessed by any architecture known in the art. Embodiments of the invention are not limited to a particular memory architecture (e.g. are not limited to a memory core containing an array of memory cells addressed by row and column). FIG. 2 illustrates an exemplary memory architecture having a memory core comprising an array of bit cells, and is discussed in more detail below.

As used herein the term "memory cell" means a circuit element, which stores one or more bits of data. A memory cell storing a single bit of data is also denoted herein a "bit cell". For clarity, some embodiments are described herein for a hardware memory containing an array of bit cells. However, such descriptions do not limit the invention to a memory core, which includes an array of memory cells nor to memory cells, which store a single bit of data (i.e. bit cells).

As used herein the term "memory data" means data written and/or read and/or held in the memory cell or cells.

Examples of memory cells which may be used in embodiments of the invention include but are not limited to: 6T static random-access memory (SRAM), 8T SRAM, 9T SRAM, 10T SRAM, 4T dynamic random-access memory (DRAM), 2T DRAM and 3T DRAM.

Peripheral Circuitry

Peripheral circuitry 120 includes circuit elements necessary for reading and writing data to the memory cell or cells in memory core 110. The specific functionality and circuit elements of peripheral circuitry 120 vary according to the specific implementation of the memory.

As used, herein the term "peripheral circuitry" means circuitry, which controls the memory core in a deterministic way, possibly based on internal logic and/or external commands. The peripheral circuitry reads and writes data to the memory core, and may perform additional functions including but not limited to: pre-charge, power gating, power boosting and/or other functions for improved stability and/or energy consumption.

Optionally, peripheral circuitry 120 includes one or more of:
a) Pre-charge circuitry;
b) A decoder;
c) A power gate;
d) A sense amplifier;
e) Read/write circuitry;
f) Supply voltage booster circuitry;
g) A supply voltage generator
h) A hardware controller;
i) A multiplexer;
j) A logic element;
k) A timing element;
l) Biasing circuitry;
m) A processor;
n) A data interface;
o) A driver;
p) A level shifter; and
q) A delay element.

Randomization Circuitry

Randomization circuitry 130 reduces a correlation between current consumed by the memory and memory data by randomizing peripheral circuitry operation, thereby to cause the peripheral circuitry and/or memory core to consume current in a randomized manner (i.e. not directly correlated with data written and/or read and/or held in the memory core). Thus the current consumed by memory 100 may vary even if the identical activity is performed by or on memory 100.

Optionally, peripheral circuitry operations are randomized using one or more random sequences to control some or all of the peripheral circuitry.

Optionally, some or all of randomization circuitry 130 is embedded within the memory device and/or the peripheral circuitry. Alternately or additionally, some or all of randomization circuitry 130 is external to the memory module.

For example, FIG. 2 (described below) includes sense amplifiers (in 240) and Sense Amp Control 280 (which controls the sense amplifiers). In an exemplary embodiment, the sense amplifiers are embedded in the memory while Sense Amp Control 280 is external to the memory and provides external control signals to the sense amplifiers.

The randomized sequence may be generated by any means known in the art. Exemplary circuits for generating random sequences include:
a) Analog based circuits, which amplify physical factors, which introduce noise into the design (e.g. thermal noise, leakage currents, threshold voltage sensing, ring oscillator-based randomness, chaotic circuits, metastable based oscillators, etc.).
b) Digital circuits, which provide random, pseudo-random or true random signals such as: non-linear or linear feedback shift register (LFSR), pseudo (deterministic) random number generator, true (non-deterministic) random number generator or random number generator using a shift register with feedback.

Exemplary embodiments of randomizing peripheral circuitry operation are presented below.

Optionally, the correlation between the data and the current consumed by the memory is reduced during one or more of:
a) Data read;
b) Data write; and
c) Data hold.

As used herein the term "randomized" and similar terms, used to describe the control of peripheral circuitry operations, means that a degree of randomness (e.g. true randomness and/or pseudo randomness) is introduced into the operations by which the peripheral circuitry accesses and/or controls and/or provides input signals to the memory cells.

Optionally, randomization circuitry 130 randomizes peripheral circuitry operation by one or both of:
a) Controlling the operation of peripheral circuitry 120 (e.g. providing control signals to inputs of peripheral circuitry 120);
b) Changing signals output by peripheral circuitry 120 and providing the changed signals to memory core 110.

Randomization circuitry 130 may include logic, data and other tools (such as a random signal generator) as needed to randomize peripheral circuitry operations. Optionally, randomization logic 140 is implemented as logic circuitry and/or by an internal or external processor (not shown) which is configured to apply randomization logic 140 to peripheral circuitry 120 and/or memory core 110.

Optionally, peripheral circuitry operation is randomized per cycle (e.g. over multiple cycles of operation). Alternately or additionally, peripheral circuitry operation is randomized within the clock period (intra-cycle).

Optionally, the selection of which techniques to employ for randomizing peripheral circuitry operation is made dynamically by randomization circuitry 130 and may vary during the operation of memory 100.

Randomizing the operations of the peripheral circuitry may include one or more of:
a) Current randomization;
b) Two-stage write operations;
c) Power boosting; and
d) Sense-amplifier control.

A. Impedance Randomization

Optionally, peripheral circuitry 120 includes an impedance randomization unit (IRU) which introduces amplitude and/or temporal randomization of the current in order to hide information leakage.

Optionally, the IRU includes a parallel connection of transistor devices (NMOS and PMOS) where there is always a minimal number of open transistor devices. By randomly selecting the number of open parallel transistor devices the amplitude and temporal behavior of the power supply current is modulated.

B. Two-Stage Write Operation

The dynamic power consumption of a bit cell during a write operation depends on the value stored in the bit cell prior to the write event and on the data to be written. If the data to be written is different than the voltage stored in the cell, the inverters of the cell will flip and consume the required energy to charge and discharge the internal nodes. On the other hand, if the written data is the same as that stored in the cell only leakage energy is consumed.

Optionally, the write operation is split into two phases in order to avoid this clear correlation. First two or more storage nodes in the memory cell (e.g. Q and QB) are randomly charged to the same or different voltage level(s). After the randomized charging, the data is written to the memory cell (typically by charging the bit line to the write data and asserting the word line).

In an exemplary embodiment, the randomization circuitry controls the peripheral circuitry so that data is written to a memory cell as follows:

i) Either the first voltage level or the second voltage level (e.g. ground) is randomly selected;
ii) The bit lines of the memory cell are charged to the selected supply voltage; and
iii) The data is written to the memory cell.

Further exemplary embodiments of randomizing peripheral circuitry operation using a two-stage write operation (for a memory core containing an array of bit cells) are presented in more detail as Method 1 below.

C. Power Boosting

In power boosting embodiments the supply voltages provided to the bit line(s) and/or active word line (WL) of memory core 110 are changed randomly over time. Power boosting may be applied during the pre-charge phase and/or write phase and/or read phase of memory operation, according to the given embodiment.

The supply voltages may be boosted at different times during memory operation, including but not limited to:

a) Within the clock period (intra-cycle);
b) Per cycle (e.g. at the system or device frequency); and
c) Over multiple cycles (e.g. every three cycles).

In embodiments of the invention, which include power boosting, multiple supply voltages are available for powering the memory. Optionally peripheral circuitry 120 includes a voltage supply, which provides multiple voltage levels.

Optionally, randomization circuitry 130 varies the supply voltage levels applied to at least one bit line of a respective memory cell randomly over time. In memory cells with both a bit line (BL) and a bit line bar (BLB) input, the voltage level may be varied over one or both of BL and BLB.

Alternately or additionally, randomization circuitry 130 varies the voltage levels applied to at least one word line of a respective memory cell randomly over time.

Exemplary embodiments of randomizing peripheral circuitry operation using power boosting are presented in more detail as Methods 2a and 2b below. In non-limiting Methods 2a and 2b, the bit line(s) (BL and/or BLB) and/or word lines (WL) are divided into chunks and each chunk is randomly boosted to a different voltage level.

D. Sense-Amplifier Control

In some embodiments of the invention, peripheral circuitry 120 includes one or more sense-amplifiers. Typically, sense-amplifiers amplify differential readouts of data stored in the memory cell. Randomly varying the current consumed by the sense-amplifier(s) causes random variations in the overall current consumed by the memory.

Optionally, randomization circuitry 130 randomizes the current consumption of at least one sense amplifier. Optionally, the current consumption of the sense amplifier(s) includes one or more of:

a) Randomizing enable signal delays of said at least one sense amplifier;
b) Randomizing enable signal voltage levels of said at least one sense amplifier;
c) Randomizing respective leakage powers of said at least one sense amplifier;
d) Randomly disconnecting an input of said at least one sense amplifier during a data hold state; and
e) Randomly disconnecting an input of said at least one sense amplifier during a data write cycle.

Exemplary embodiments of randomizing peripheral circuitry operation using sense-amplifiers are presented in more detail as Method 3 below.

Exemplary General Memory Architecture

FIG. 2 is a simplified block diagram of a memory configured to implement one or more of the exemplary embodiments described herein, separately or in combination. The memory core consists of memory cells (210.11 to 210.$nm$).
Optionally, the memory cells may be written to (i.e. programmed) or read out individually or as part of a word consisting of a predefined number of bits.

Optionally, the memory cells (210.11 to 210.$nm$) are folded into a relatively square array. This memory core array structure may serve to minimize the wire length required to access the memory cells of a random access memory, thus optimizing area, access time and power The peripheral circuitry includes: BL Drivers/Precharge 220, Decoders & Drivers 230, and Sense Amplifiers and Column Multiplexers 240.

The randomization circuitry includes one or more of:

a) Memory VDD Control 250—controls the power supply voltage levels applied to bit line(s) and/or word line(s) of the memory cell array.
b) BL Voltage Control 260—controls the power supply voltage levels applied to bit lines BL[0]-BL[m] and BLB[0]-BLB[m] (e.g. for power boost embodiments), where m is the number of bits in a row.
c) WL Voltage Control 270—controls the power supply voltage levels applied to word lines(s) WL[0]-WL[n] (e.g. for power boost embodiments), where n is the number of rows.
d) Sense Amp Control 280—controls sense amplifiers 240 using control signals SAE[0]-SAE[m] (e.g. for sense-amplifier control embodiments).

Optionally, horizontal (X-addressing) and vertical (Y-addressing) is used to access a selected memory cell/word. The busses used to access the rows are referred to herein as word lines and the columns are referred to herein as bit lines. To assert the word lines and bit lines, an addressing scheme is required, optionally implemented using a row decoder and a column decoder or multiplexer.

Any suitable addressing scheme may be used. An optional addressing scheme asserts an entire row by selecting a word line through the row decoder and directs the selected bit line to the output through the column multiplexer.

Optionally, the memory array is accessed dynamically. Reading is done dynamically by pre-charging all bit lines to a predetermined state and using sense amplifiers to detect the selected cell's level at a reduced swing providing an advantage in both speed and power. Writing is achieved in a similar fashion, where the bit lines are pre-charged or pre-discharged prior to enabling a connection to the cells' internal storage nodes. This column-wise read and write access are achieved with pre-charge circuits and write drivers. Further, optionally, the pre-charge circuit is enabled by a PC signal prior to a read operation.

The outputs of the row-decoder are referred herein to as word-lines (WL). Typically, in each cycle of read (R) or write (W) operation one WL signal is at '1' where all the rest of the WLs are at '0'. Read or Write logic blocks are enabled by a read signal and a write signal respectively.

Optionally, the output values which are read out of the memory enter a sense amplifier (SA) circuit which amplifies small voltage changes (on differential bit lines, BL and BLB) to strong '1' and '0' values depending on whether the difference (between BL and BLB) is positive or negative.

Optionally, power-gates (not shown in FIG. 2) are included. These power gates (PG) may shut-off the power supply to a part of or the entire memory array. The shut-off mechanism is typically enabled when the memory is in IDLE mode (or is inactive) in order to save leakage power.

Optionally, the memory is partitioned. Memory partitioning is an important factor in its design. The size of the memory is generally determined by the system's needs; however performance, power and area requirements usually set limits on array block sizes. Various techniques are used to optimize the size of each block for the system's specification and block partitioning may be implemented. In this case, a third level of decoding, often referred to as Z-addressing, is added to access the selected partition.

Method for Securing a Memory

Figure 3:
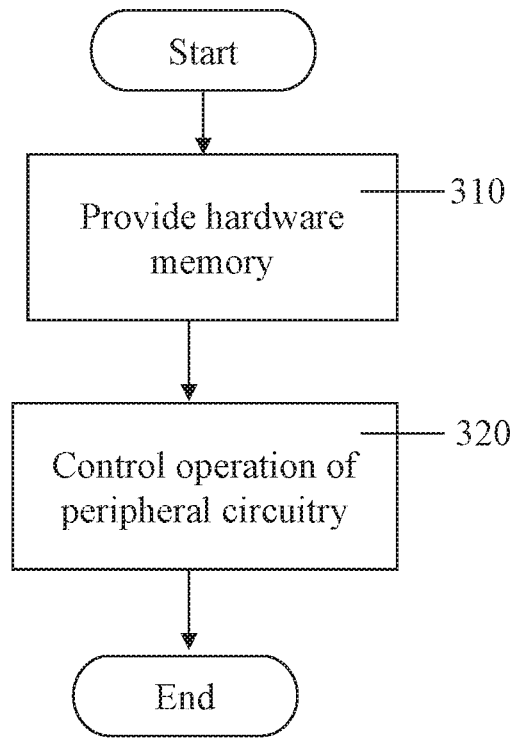
FIG. 3 is a simplified flowchart of a method for securing a memory, according to embodiments of the invention.

Reference is now made to FIG. 3 which is a simplified flowchart of a method for securing a memory, according to embodiments of the invention.

In 310, a hardware memory is provided. The memory includes:
  a) at least one memory cell for storing data; and
  b) peripheral circuitry for controlling the at least one memory cell.

In 320, some operations of the peripheral circuitry are randomized so as to reduce a correlation between current consumed by the memory and memory data.

Randomizing the operations of the peripheral circuitry may include one or more of:
  a) Two-stage write operations;
  b) Power boosting; and
  c) Sense-amplifier control.

Figure 4:
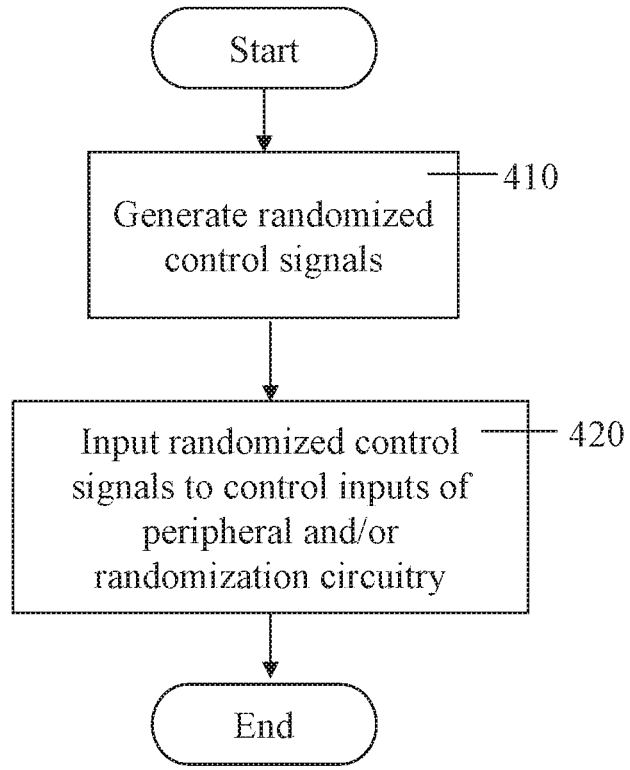
FIG. 4 is a simplified flowchart of a method of randomizing peripheral circuitry operations according to embodiments of the invention.

Reference is now made to FIG. 4, which is a simplified flowchart of a method of randomizing peripheral circuitry operations according to embodiments of the invention.

In 410, randomized control signals (e.g. a random bit sequence) are generated. The control signals may be generated by any means known in the art (examples of which are described above).

In 420, the randomized control signals are provided to control inputs of the peripheral circuitry and/or randomization circuitry (if present). Alternately or additionally, the randomized control signals are used to adapt or change output signals from the peripheral circuitry prior to providing them to memory core inputs (e.g. BL, WL, etc.).

Attacker Profiles:

Attacker profiles may be categorized in accordance with their ability to operate, thwart and access the system. The profiles presented herein are non-limiting to the embodiments of the invention and are presented solely for consideration with respect to the embodiments described herein.

The attackers are divided herein into four categories:

1. An attacker who can access each bit of the memory and perform read operations. Attack scenario—This is powerful and unrealistic scenario as the attacker has direct access to all bits of the memory and does not "need" to perform SCAs.

2. An attacker who is able to perform writes and reads to each bit but cannot see the read value nor understand it from outputs of the system.
Attack scenario—Reading multiple times while randomly changing the rest of the memory content. Performing statistical tests to extract secret information. The Read energy will be evident in the total energy.

3. An attacker who cannot perform a read or write of the secret key.
Attack scenario—Leakage currents (steady-state) attack will evident different values stored in bits. While randomly changing the rest of the memory content in a cleaver fashion this information can be extracted.

4. An attacker who is bound to one of the profiles above (1-3) but the secret bits\words the attacker is attempting to obtain are stored on multiple rows of the memory.
No known attack scenarios exist however combination of Attack Scenarios 2 and 3 can alleviate information extraction (at least partially).

Exemplary Methods

Optionally, the exemplary embodiments presented herein are embedded in various embodiments inter-cell, thus providing a solution applicable to secured embedded memories in general.

It is noted that some exemplary embodiments presented herein use the same variable names (for example the variable "j" is used to indicate for the number of supply voltages in Method 2a and the number of random signals in Method 3). It is hereby noted that the use of the same variable name in different exemplary embodiments is not intended to indicate that the number of variables of the same name is identical for all embodiments (for example in an exemplary embodiment which incorporates Method 2a and Method 3, the number of supply voltages and the number of random signals is not necessarily the same).

Method 1 (WRITE Operation: Two-Stage Write w. Row Power Gate)

The dynamic power consumption of a bit-cell during a write operation depends on the value stored in the bit cell prior to the write event and on the data to be written. If the data to be written is different than the voltage stored in the cell, the inverters of the cell will flip and consume the energy required to charge and discharge the internal nodes. On the other hand, if the written data is the same as that stored in the cell, only leakage energy is consumed.

Method 1 is an exemplary embodiment in which the write operation is split into two phases to avoid this clear correlation. At least two voltage levels are available to be connected to the bit lines (denoted herein V1 and V2). In an exemplary embodiment, V1 is GND and V2 is VDD.

During phase one, the power to the selected row is cut off to avoid write contention. Then, both bit lines (BL and BLB) are randomly pre-charged to either V1 or V2 and the word line is asserted. As a result, the feedback of each cell in the selected row is cut off, enabling both nodes (Q and QB) to charge to V1 or V2.

The second phase is similar to a conventional write, where each bit line is charged to the write data and the word line is asserted to bring the cell to its required state after write.

Figure 5:
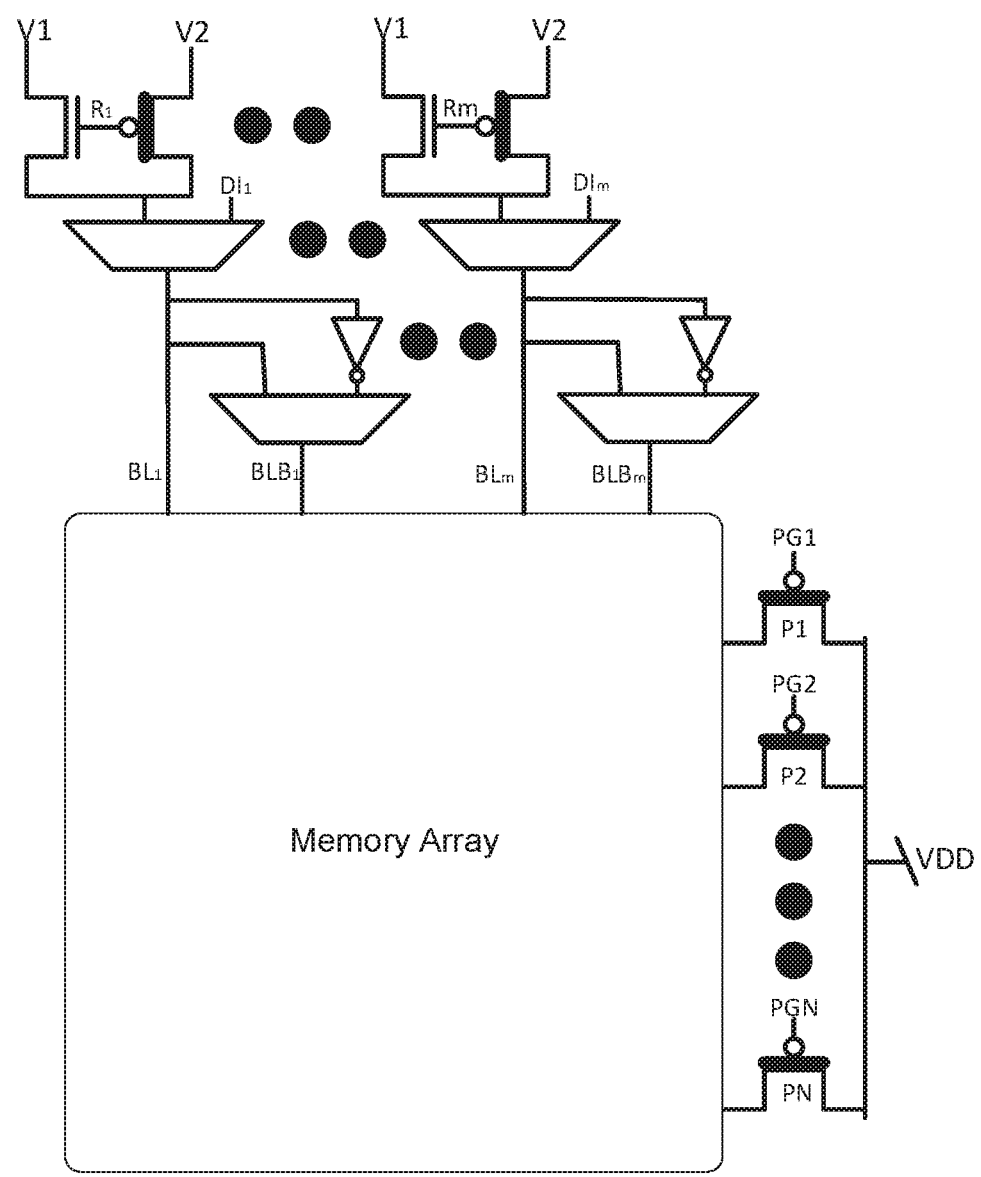
FIGS. 5-9 are simplified block diagrams of memory architectures, according to respective exemplary embodiments of the invention.

Reference is now made to FIG. 5, which is a simplified block diagram of a first exemplary memory architecture for implementing the two-stage write embodiment. Transistors P1-PN power gate rows in the array and are controlled by signals PG1-PGN respectively. During the first phase of a write event to row x, PGx discharges, cutting off the power to each cell in the array.

Figure 6:
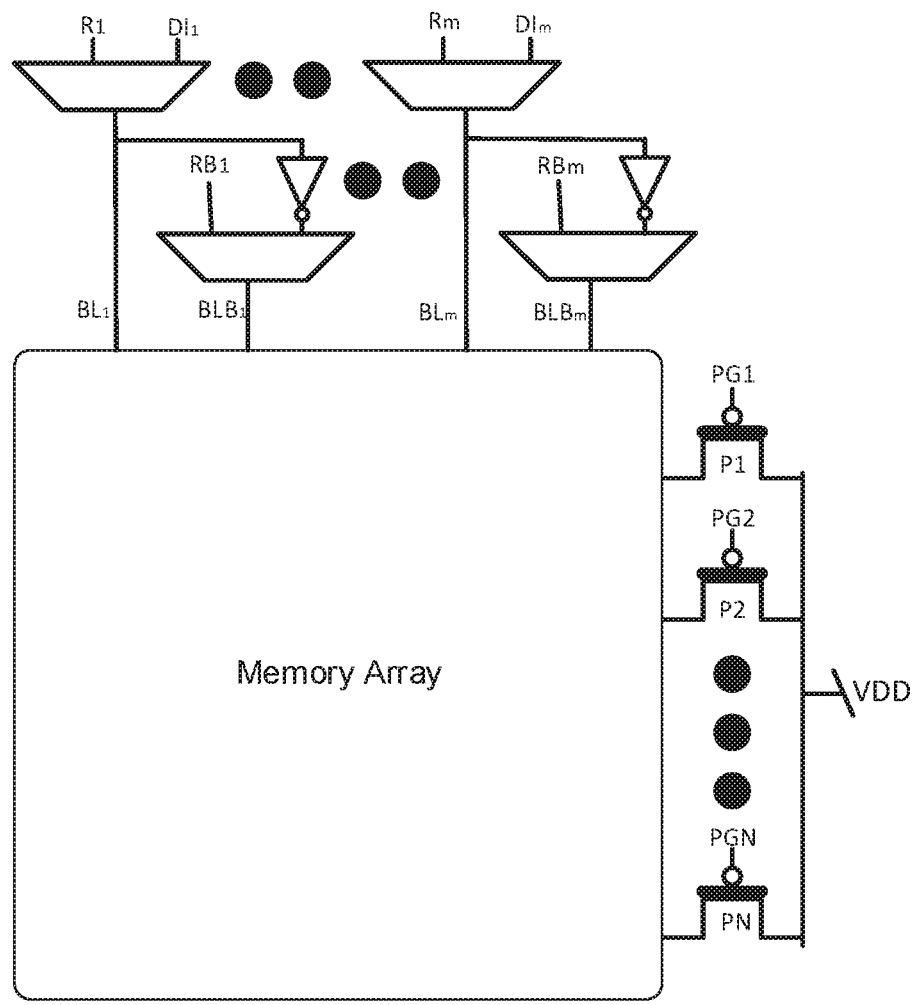

Reference is now made to FIG. 6, which is a simplified block diagram of a second exemplary memory architecture for implementing the two-stage write embodiment. Transistors P1-PN power gate rows in the array and are controlled by the signals PG1-PGN respectively. During the first phase of a write event to row x, PGx discharges, cutting off the power to each cell in the array. In this embodiment, the storage nodes within a memory cell may be pre-charged to different voltages.

Method 2a (READ\WRITE\PRE-CHARGE Operations: BL Power Boosting)

Method 2a is an exemplary embodiment of the invention, which provides a security mechanism using BL power boosting.

Figure 7:
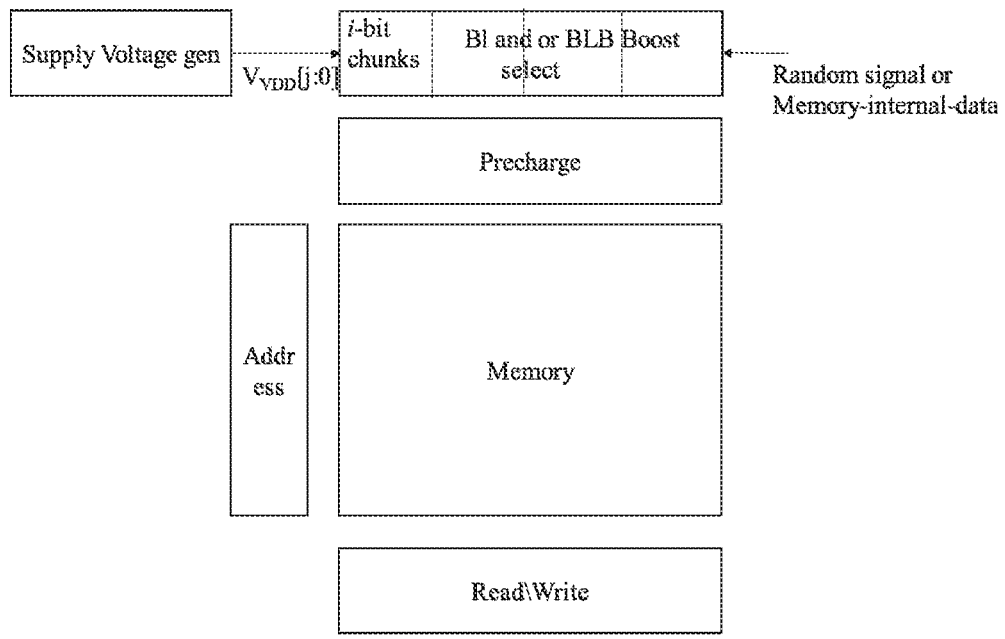

Reference is now made to FIG. 7 which is a simplified block diagram of an exemplary memory architecture for implementing Method 2a.

A Supply Voltage generator module provides j+1 different supply voltages (VDD[j:0]). The BL and or BLB lines of i-bit chunks are boosted (or not) to the set of supplied voltages. The BL and or BLB Boost select module chooses which i-bit chunks to boost according to random signals and/or memory internal data signals. The boosting may apply in the pre-charge phase and/or write phase and/or read phase to one or two of the bit-lines.

Boosting the bit line voltage results in different active and static power patterns as both the dynamic energy during write/read/hold cycles and the leakage power of un-accessed words will depend on the boosted supply voltages levels.

Method 2b (READ\WRITE Operations: WL Power Boosting)

Method 2b is an exemplary embodiment of the invention, which provides a security mechanism using WL power boosting.

Figure 8:
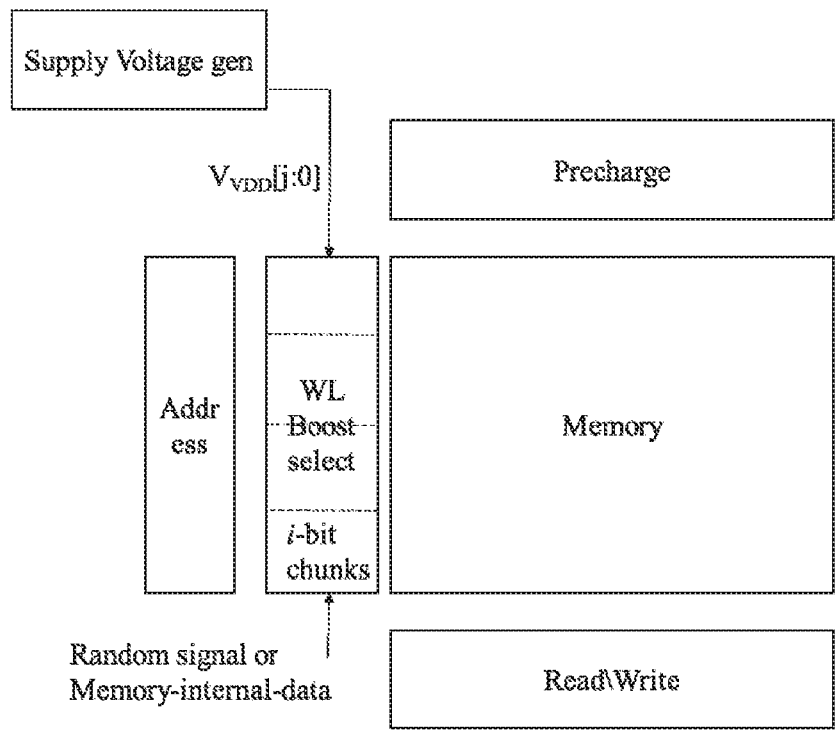

Reference is now made to FIG. 8, which is a simplified block diagram of an exemplary memory architecture for implementing Method 2b.

A Supply Voltage generator module provides j+1 different supply voltage (VDD[j:0]). The active WL of one of the i-bit chunks is boosted (or not) to the voltage which is supplied to it. The WL Boost select module chooses which i-bit chunk to boost according to a random signal and/or memory internal data signals. The boosting may apply in the write phase and/or read phase.

Boosting the WL line voltage results in different active and static power patterns as both the dynamic energy during write/read cycles and the leakage power of the accessed words will depend on the boosted supply voltages level, regardless of the memory data.

Method 3 (READ\WRITE\HOLD Operations: Secured Sense-Amplifier)

Method 3 is an exemplary embodiment of the invention which provides a security mechanism using one or more sense-amplifiers.

Figure 9:
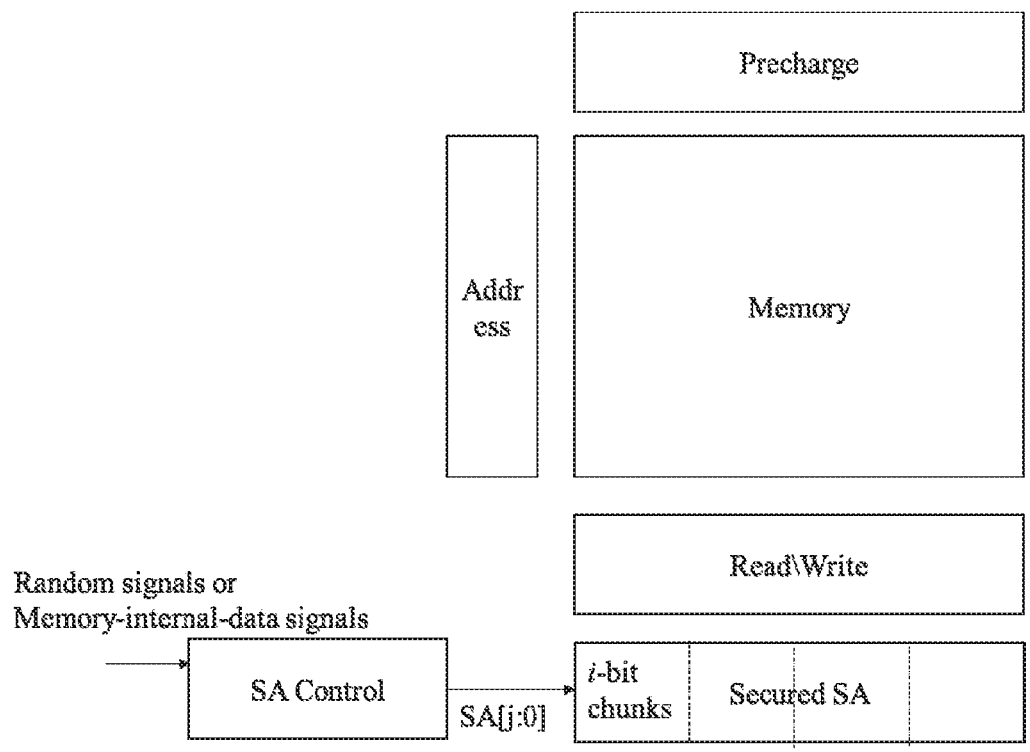

Reference is now made to FIG. 9, which is a simplified block diagram of an exemplary memory architecture for implementing Method 3.

A sense-amplifier control block (denoted SA Control in FIG. 9) is added to the periphery of the memory array. The SA control block is supplied with random signals and/or memory internal data signals to produce j+1 random control signals to i-bit chunks of the sense-amplifier (denoted Secured SA in FIG. 9). These control signals alter the sense-amplifier power consumption, regardless of the memory read from the array through the sense-amplifier.

For example, the delay of the enable signal and/or the enable-signal voltage level of the sense-amplifier may be changed, resulting in different power patterns during each readout cycle and/or randomly alternating the leakage (steady-state) power of the sense-amplifier. Also, these additional control signals may decouple\disconnect the inputs of the sense-amplifier in hold\write states (and\or assign random values to its inputs).

The above-described embodiments provide architectural and circuit level approaches for reducing the correlation of memory data from current consumed by the memory. The reduction in correlation may be achieved at any level of the circuit design, from single cell memories to memory arrays and may be easily embedded into the logic circuit.

It is expected that during the life of a patent maturing from this application many relevant memory cells, bit cells, arrays of memory cells, memory devices, memory architectures, peripheral circuitries and elements of the peripheral circuitry will be developed and the scope of the term memory cell, bit cell, array, memory device, architecture and peripheral circuitry is intended to include all such new technologies a priori.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A hardware memory comprising:
   a plurality of memory cells configured to store data and arranged as an array;
   peripheral circuitry, associated with said plurality of memory cells, configured to read and write data to said plurality of memory cells; and
   randomization circuitry, associated with said peripheral circuitry, configured to reduce a correlation between current consumed by said hardware memory and said data by randomizing peripheral circuitry operation,
   wherein, during write operations, said randomization circuitry controls said peripheral circuitry to write data to said array by:
   cutting off power to a selected row of said array;
   charging respective bit lines of memory cells in said row randomly to one of a first voltage level and a second voltage level;
   asserting a selected word line;
   charging said bit lines to respective levels of said write data; and
   asserting said selected word line.

2. A hardware memory according to claim 1, wherein said randomizing peripheral circuitry operation is performed per cycle.

3. A hardware memory according to claim 1, wherein said randomizing peripheral circuitry operation is performed intra-cycle.

4. A hardware memory according to claim 1, wherein said peripheral circuitry comprises at least one of:
   pre-charge circuitry;
   a decoder;
   a power gate;
   a sense amplifier;
   read/write circuitry;
   supply voltage booster circuitry;
   a supply voltage generator;
   a hardware controller;
   a multiplexer;
   a logic element;
   a timing element;
   biasing circuitry;
   a processor;
   a driver;
   a level shifter; and
   a delay element.

5. A hardware memory according to claim 1, said randomization circuitry is configured to reduce a correlation between said current consumed by said hardware memory and data held in said plurality of memory cells.

6. A hardware memory according to claim 1, wherein said randomization circuitry is configured to reduce a correlation between said current consumed by said hardware memory and data written to said plurality of memory cells.

7. A hardware memory according to claim 1, wherein said randomization circuitry is configured to reduce a correlation between said current consumed by said hardware memory and data read from said plurality of memory cells.

8. A hardware memory according to claim 1, wherein said randomization circuitry is configured to provide control signals to inputs of said peripheral circuitry.

9. A hardware memory according to claim 1, wherein said randomization circuitry controls said peripheral circuitry to modulate at least one of an amplitude behavior and a temporal behavior of said current consumed by said hardware memory.

10. A hardware memory according to claim 1, wherein said randomization circuitry controls said peripheral circuitry to write data to at least one of said memory cells by:
    charging at least two storage nodes of said memory cell respectively to one of a first voltage level and a second voltage level, said first voltage level and said second voltage level being randomly selected for said respective storage node; and
    writing said data to said plurality of memory cells.

11. A hardware memory according to claim 1, wherein said randomization circuitry is configured to vary supply voltage levels applied to at least one bit line of said plurality of memory cells randomly.

12. A hardware memory according to claim 1, wherein said randomization circuitry is configured to vary supply voltage levels applied to respective word lines of said plurality of memory cells randomly.

13. A hardware memory according to claim 1, wherein said peripheral circuitry comprises at least one sense-amplifier, and wherein said randomization circuitry is configured to randomize current consumption of said sense amplifier.

14. A hardware memory according to claim 13, wherein said randomizing current consumption of said at least one sense amplifier comprises at least one of:
    randomizing enable signal delays of said at least one sense amplifier;
    randomizing enable signal voltage levels of said at least one sense amplifier;
    randomizing respective leakage powers of said at least one sense amplifier;
    randomly disconnecting an input of said at least one sense amplifier during a data hold state; and
    randomly disconnecting an input of said at least one sense amplifier during a data write cycle.

15. A hardware memory according to claim 1, further comprising a hardware data interface, configured to input data for writing to said plurality of memory cells and to output data read from said plurality of memory cells.

16. A method for securing a memory, comprising:
    providing a hardware memory comprising:
       a plurality of memory cells configured to store data and arranged as an array;
       peripheral circuitry, associated with said plurality of memory cells, configured to read and write data to said plurality of memory cells; and
       randomization circuitry, associated with said peripheral circuitry, configured to reduce a correlation between current consumed by said hardware memory and said data by randomizing operations of said peripheral circuitry; and
    during write operations, controlling said peripheral circuitry using said randomization circuitry to write data to said array by:
       cutting off power to a selected row of said array;
       charging respective bit lines of memory cells in said row randomly to one of a first voltage level and a second voltage level;
       asserting a selected word line;

charging said bit lines to respective levels of said write data; and asserting said selected word line.

17. A method according to claim 16, wherein said randomizing operations of said peripheral circuitry comprises inputting randomized control signals to said peripheral circuitry.

18. A method according to claim 16, wherein said randomizing operations of said peripheral circuitry comprises altering signals output by said peripheral circuitry and inputting said altered signals to said plurality of memory cells.

19. A method according to claim 16, wherein said correlation is between said current consumed by said hardware memory and at least one of:

data held in said hardware memory;

data written to said hardware memory; and data read from said hardware memory.

20. A method according to claim 16, wherein said randomizing operations of said peripheral circuitry comprises introducing at least one of amplitude randomization and temporal randomization to said current consumed by said hardware memory.

21. A method according to claim 16, wherein said randomizing operations of said peripheral circuitry comprises:

randomly selecting a respective one of a first voltage level and a second voltage level for each of a plurality of storage nodes of said plurality of memory cells;

charging said plurality of storage nodes to said respective selected voltage levels; and writing said data to said hardware memory.

22. A method according to claim 16, wherein said randomizing operations of said peripheral circuitry comprises randomly varying voltage levels applied to at least one bit line of said hardware memory.

23. A method according to claim 16, wherein said randomizing operations of said peripheral circuitry comprises randomly varying voltage levels applied to at least one word line of said hardware memory.

24. A method according to claim 16, wherein said randomizing operations of said peripheral circuitry comprises randomizing current consumption of at least one sense amplifier configured to amplify output signals read from said plurality of memory cells.

25. A method according to claim 24, wherein said randomizing operations of said peripheral circuitry comprises at least one of:

randomizing enable signal delays of said at least one sense amplifier;

randomizing enable signal voltage levels of said at least one sense amplifier;

randomizing respective leakage powers of said at least one sense amplifier;

randomly disconnecting an input of said at least one sense amplifier during a data hold state; and randomly disconnecting an input of said at least one sense amplifier during a data write cycle.

* * * * *